United States Patent
Isaji

(10) Patent No.: US 6,825,799 B2
(45) Date of Patent: Nov. 30, 2004

(54) RADAR APPARATUS EQUIPPED WITH ABNORMALITY DETECTION FUNCTION

(75) Inventor: Osamu Isaji, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/792,455

(22) Filed: Mar. 3, 2004

(65) Prior Publication Data

US 2004/0174293 A1 Sep. 9, 2004

(30) Foreign Application Priority Data

Mar. 4, 2003 (JP) ........................................ 2003-057518

(51) Int. Cl.⁷ .......................... G01S 7/40; G01S 13/32; G01S 13/58
(52) U.S. Cl. .......................... 342/173; 342/89; 342/91; 342/92; 342/104; 342/118; 342/128; 342/165; 342/175; 342/195; 342/196
(58) Field of Search .......................... 342/89–103, 118, 342/128–133, 165–175, 192–197, 104–117; 455/63.1, 67.11, 67.13, 67.15, 67.16, 114.2, 115.1, 115.3, 205, 226.1, 226.2, 226.3, 296

(56) References Cited

U.S. PATENT DOCUMENTS

| | | | |
|---|---|---|---|
| 4,106,020 A | * 8/1978 | Johnson | 342/128 |
| 4,123,719 A | * 10/1978 | Hopwood et al. | 342/174 |
| 4,245,221 A | * 1/1981 | Kipp et al. | 342/128 |
| 4,435,712 A | * 3/1984 | Kipp | 342/128 |
| 4,468,638 A | * 8/1984 | Kyriakos | 342/174 |
| 4,679,049 A | * 7/1987 | Riffiod | 342/172 |
| 5,291,200 A | * 3/1994 | Lo | 342/174 |
| 5,841,393 A | * 11/1998 | Saito et al. | 342/165 |
| 5,886,663 A | * 3/1999 | Broxon et al. | 342/165 |
| 6,278,399 B1 | * 8/2001 | Ashihara | 342/173 |
| 6,369,747 B1 | * 4/2002 | Ashihara | 342/165 |
| 6,414,623 B1 | * 7/2002 | Ashihara | 342/173 |
| 6,414,628 B1 | * 7/2002 | Ashihara | 342/173 |
| 6,445,335 B1 | * 9/2002 | Tamatsu | 342/174 |
| 6,756,933 B2 | * 6/2004 | Ishii et al. | 342/129 |

* cited by examiner

*Primary Examiner*—Bernarr E. Gregory
(74) *Attorney, Agent, or Firm*—Christie, Parker and Hale, LLP

(57) ABSTRACT

Disclosed is a radar apparatus equipped with a function for detecting an abnormality of noise floor level. An abnormality of noise floor level is detected by measuring the level in a region not lower than 60 kHz when FM modulation is stopped or modulation width is made infinitely small by instruction from a CPU to a modulating signal generator.

15 Claims, 1 Drawing Sheet

RADAR APPARATUS EQUIPPED WITH ABNORMALITY DETECTION FUNCTION

CROSS-REFERENCE TO RELATED APPLICATION

This application claims priority of Japanese Patent Application Number 2003-57518, filed on Mar. 4, 2003.

BACKGROUND OF THE INVENTION

1. Field of the Invention

The present invention relates to a radar apparatus equipped with an abnormality detection function and, more particularly to an FM-CW radar apparatus equipped with a function for detecting an abnormality in the noise floor level.

2. Description of the Related Art

An FM-CW radar radiates forward transmitted waves frequency-modulated by a modulating signal of a triangular waveform alternating cyclically between an upsweep section and a downsweep section, and produces a beat signal by mixing the waves reflected from a target with a portion of the transmitted waves. When the frequency of the beat signal in the downsweep section is denoted by $f_b(\text{down})$ and the frequency of the beat signal in the upsweep section by $f_b(\text{up})$, the beat frequency $f_r$ due to the distance to the target and the beat frequency $f_d$ due to the relative velocity of the target are respectively calculated as $$f_r = (f_b(\text{down}) + f_b(\text{up}))/2 \quad (1)$$

$$f_d = (f_b(\text{down}) - f_b(\text{up}))/2 \quad (2)$$

From these, the distance R to the target and the relative velocity V of the target can be respectively calculated as $$R = c \cdot f_r \cdot T / 4\Delta F \quad (3)$$

$$V = c \cdot f_d / 2 f_0 \quad (4)$$

(where c is the velocity of light, T is the period of the triangular wave, $\Delta F$ is the frequency modulation width (frequency shift width), and $f_0$ is the center frequency.) Therefore, the values of $f_b(\text{down})$ and $f_b(\text{up})$ are determined from the peaks appearing in the beat signal spectrum in the frequency domain obtained by Fourier transforming the beat signal, and the distance and the relative velocity of the target are determined using the equations (1) to (4).

If there is an abnormality of noise floor level in the Fourier transform result of the beat signal, an erroneous peak detection may result. There is therefore a need to detect an abnormality of noise floor level.

SUMMARY OF THE INVENTION

It is accordingly an object of the present invention to provide a radar apparatus, equipped with a function for detecting an abnormality of noise floor level, at low cost.

A radar apparatus according to the present invention comprises: a measuring unit measuring a target distance and a relative velocity by analyzing a peak appearing in a Fourier transform result of a beat signal produced between a frequency-modulated transmit wave and a reflected wave thereof; a unit substantially stopping the frequency modulation of the transmit wave; and an abnormality detecting unit detecting an abnormality of noise floor level based on the Fourier transform result obtained while the frequency modulation is substantially stopped.

DESCRIPTION OF THE PREFERRED EMBODIMENTS

Figure 1:
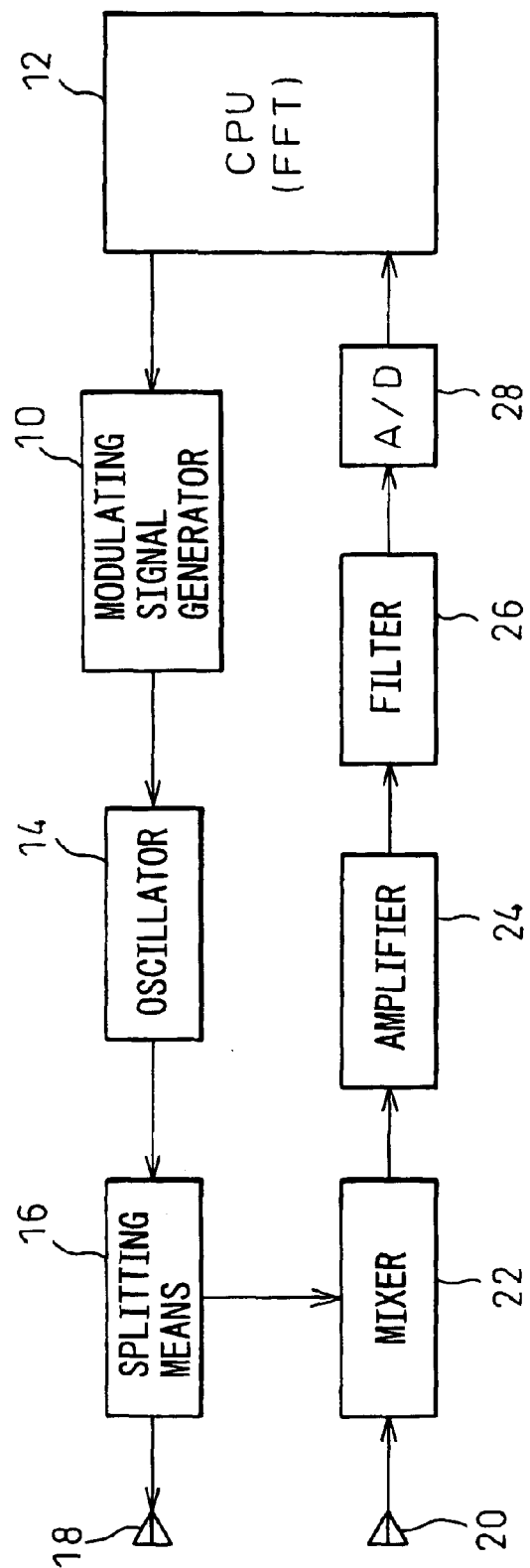
FIG. 1 is a diagram showing the configuration of an FM-CW radar to which the present invention is applied.

FIG. 1 shows the configuration of an FM-CW radar apparatus equipped with an abnormality detection function according to one embodiment of the present invention.

In FIG. 1, a modulating signal generator 10, under instruction from a CPU 12, generates a modulating signal of a triangular waveform alternating cyclically between an upsweep section and a downsweep section. A voltage-controlled oscillator 14 generates a transmit wave comprising a continuous signal frequency-modulated by the triangular wave. A portion of the output of the voltage-controlled oscillator 14 is separated by a splitting means 16 and is introduced into the receiver side, while the major portion of the output is radiated forward from an antenna 18. The wave reflected by a target located forward is received by an antenna 20, and mixed in a mixer 22 with the portion of the transmitted wave to produce a beat signal. The beat signal produced in the mixer 22 is amplified by an amplifier 24, passed through a filter 26 for removal of unwanted components, and converted by an A/D converter 28 into a digital signal which is supplied to the CPU 12. In the CPU 12, a fast Fourier transform operation is applied to the digitized beat signal to transform it to the frequency domain, and then the distance R and the relative velocity V of each target are calculated in accordance, for example, with the previously given equations (1) to (4).

When the FM modulation is stopped or the modulation width is made infinitely small under instruction from the CPU 12 to the modulating signal generator 10, only Doppler frequency peaks due to relative velocity appear in the spectrum obtained by Fourier transform. In the case of a transmission frequency of 76.5 GHz, for example, even if the upper limit of the relative velocity is assumed to be 400 km/h, its frequency is 57 kHz or lower. Therefore, in this case, no peak should appear, for example, in the frequency region not lower than 60 kHz; accordingly, by measuring the signal level in this region, an abnormality of noise floor level can be detected.

This measurement is repeated several times, the average value and the variation of the noise floor level are obtained from the resulting data, and the distribution range of the noise floor level is calculated from these values; then, if the calculated result is outside a set value range, the noise floor level is judged to be abnormal.

In an alternative method of abnormality judgment, a peak value of the noise floor level is obtained, and if the value is outside a set value range, the noise floor level is judged to be abnormal.

It is desirable that the noise floor level be finally judged to be abnormal when the value has been judged to be outside the set value range (abnormal) several times in succession.

Alternatively, when the noise floor level is detected as being abnormal in the judgment process, the judgment process may be repeated several times thereafter, and the noise floor level may be finally judged to be abnormal when the noise floor level has been detected as being abnormal with a frequency greater than a certain value.

If the threshold value for the number of times or the frequency with which the noise floor level is finally judged to be abnormal is varied in accordance with the level of the obtained noise peak, a further accurate detection can be accomplished.

When detecting an abnormality of the noise floor level, an accurate judgment can be made if the gain of the amplifier 24 is set higher than usual. To change the gain of the amplifier 24, the gain setting value need only be changed if it is an AGC amplifier.

As described above, according to the present invention, there is provided a radar apparatus equipped with an abnormality detection function, such as for detection of an abnormality of frequency modulation width, detection of a noise peak, and detection of an abnormality of a noise floor level.

What is claimed is:

1. A radar apparatus equipped with an abnormality detection function, comprising:
   a measuring unit measuring a target distance and a relative velocity by analyzing a peak appearing in a Fourier transform result of a beat signal produced between a frequency-modulated transmit wave and a reflected wave thereof;
   a unit substantially stopping the frequency modulation of the transmit wave; and
   an abnormality detecting unit detecting an abnormality of noise floor level based on the Fourier transform result obtained while the frequency modulation is substantially stopped.

2. A radar apparatus according to claim 1, wherein the abnormality detecting unit detects an abnormality of noise floor level in a prescribed frequency region in the Fourier transform result.

3. A radar apparatus according to claim 1, wherein the abnormality detecting unit comprises:
   a unit determining the distribution range of the noise floor level based on signal levels measured a plurality of times; and
   a unit detecting an abnormality of the noise floor level based on the determined distribution range of the noise floor level.

4. A radar apparatus according to claim 3, wherein the noise floor level is finally judged to be abnormal when the noise floor level has been detected as being abnormal a predetermined number of times in succession.

5. A radar apparatus according to claim 4, wherein the predetermined number of times is varied in accordance with the level of an obtained noise peak.

6. A radar apparatus according to claim 3, wherein the noise floor level is finally judged to be abnormal when the noise floor level has been detected as being abnormal with a frequency greater than a predetermined value.

7. A radar apparatus according to claim 6, wherein the predetermined value is varied in accordance with the level of an obtained noise peak.

8. A radar apparatus according to claim 1, wherein the abnormality detecting means judges the noise floor level to be abnormal when a peak value of a measured signal level is outside a predetermined range.

9. A radar apparatus according to claim 8, wherein the noise floor level is finally judged to be abnormal when the noise floor level has been detected as being abnormal a predetermined number of times in succession.

10. A radar apparatus according to claim 9, wherein the predetermined number of times is varied in accordance with the level of an obtained noise peak.

11. A radar apparatus according to claim 8, wherein the noise floor level is finally judged to be abnormal when the noise floor level has been detected as being abnormal with a frequency greater than a predetermined value.

12. A radar apparatus according to claim 11, wherein the predetermined value is varied in accordance with the level of an obtained noise peak.

13. A radar apparatus according to claim 1, wherein detection of the noise floor level is performed in a frequency region higher than a predetermined frequency.

14. A radar apparatus according to claim 1, wherein detection of the noise floor level is performed by increasing amplifier gain.

15. A radar apparatus according to claim 14, wherein the amplifier gain is increased by changing a set value of an AGC amplifier.

* * * * *